(No Model.)
M. J. SULLIVAN.
EXERCISING DEVICE.
No. 580,740. Patented Apr. 13, 1897.
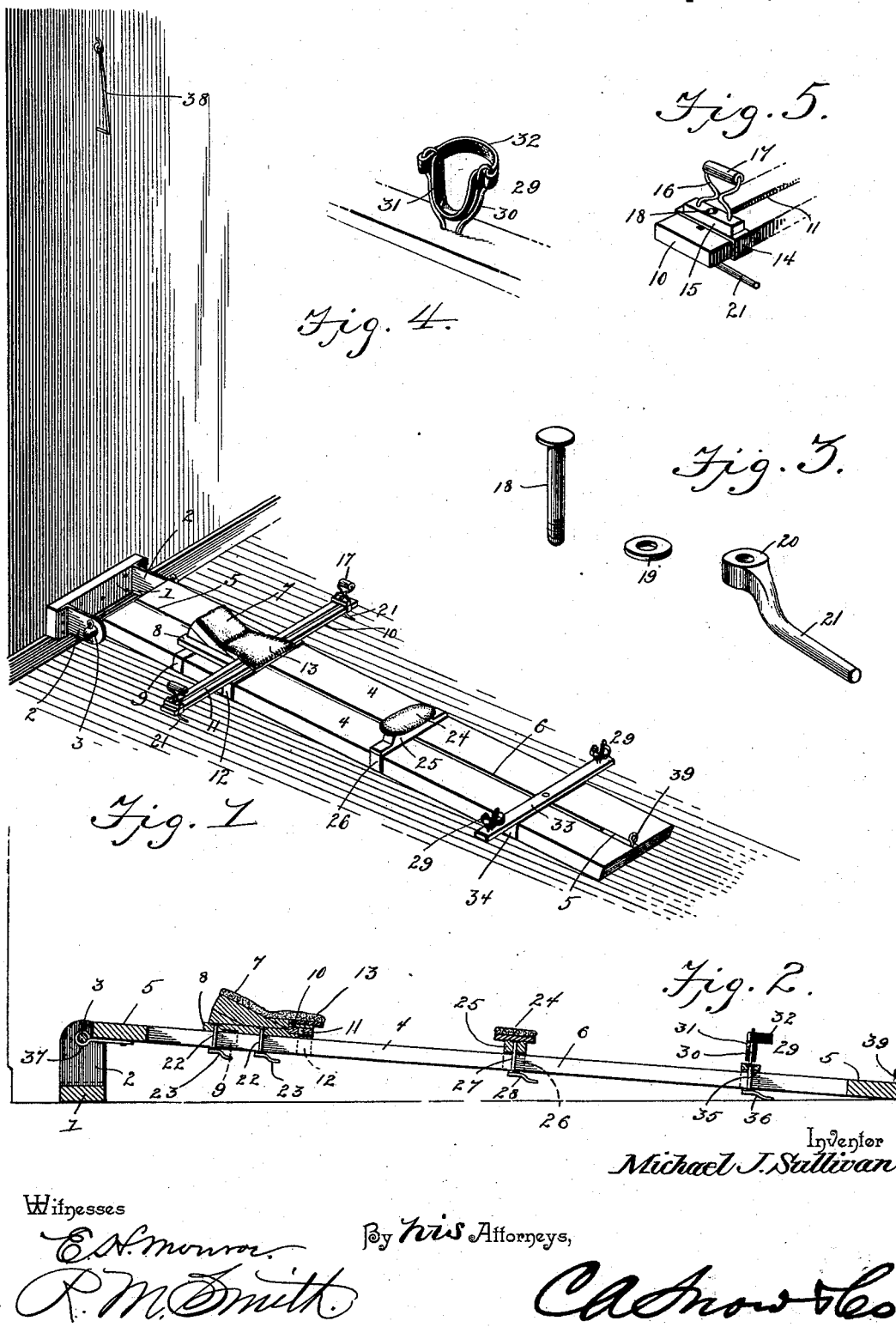
Witnesses
E. N. Monroe
R. M. Smith
Inventor
Michael J. Sullivan
By his Attorneys,
C. A. Snow & Co.

UNITED STATES PATENT OFFICE.

MICHAEL JOHN SULLIVAN, OF HOLYOKE, MASSACHUSETTS.

EXERCISING DEVICE.

SPECIFICATION forming part of Letters Patent No. 580,740, dated April 13, 1897.

Application filed September 8, 1896. Serial No. 605,183. (No model.)

*To all whom it may concern:*

Be it known that I, MICHAEL JOHN SULLIVAN, a citizen of the United States, residing at Holyoke, in the county of Hampden and State of Massachusetts, have invented a new and useful Rub-Down Board, of which the following is a specification.

This invention relates to appliances for treating invalids, patients, and athletes; and it has for its object to provide a simple, convenient, and efficient rub-down board embodying adjustable parts which may be moved to different points thereon and fitted to the anatomy of each individual, the said appliance being adapted when not in use to be folded compactly against the wall, where it will be out of the way.

The invention consists in a rub-down board embodying certain novel features and details of construction and arrangement of parts, as hereinafter particularly described, illustrated in the drawings, and incorporated in the claims.

In the drawings, Figure 1 is a perspective view of a rub-down board constructed in accordance with the present invention. Fig. 2 is a longitudinal section through the same. Fig. 3 is a detail perspective view of one of the clamping-bolts and its washer and nut. Fig. 4 is a similar view of one of the foot-stirrups. Fig. 5 is a detail perspective view showing one of the hand-grips and a portion of the cross-bar to which it is adjustably secured.

Similar numerals of reference designate corresponding parts in the several figures of the drawings.

Referring to the drawings, 1 designates a supporting-bracket which is adapted to be secured either to a wall or to rest upon the floor, and this bracket is provided with spaced perforated ears 2, in which an elevated rod 3 is mounted, said rod serving to support one end of the rub-down board at an elevation which will give the desired slope or inclination thereto.

The rub-down board may be made of any desired length and width and is preferably constructed of parallel timbers 4, which are spaced apart a short distance and held apart by means of spacing-blocks 5 at each end. A longitudinal slot 6, extending substantially the entire length of the board and centrally thereof, is thus formed, said slot being intended to receive the clamping-bolts of the several adjustable parts of the device hereinafter described.

7 designates an inclined and padded head-rest which is mounted upon a base board or plate 8, adapted to slide upon the upper surface of the board. To the under side of the base 8 is secured a U-shaped clip 9, the ends of which are bent downward to embrace and bear against the side edges of the board 4. At the lower end of the base 8 is arranged a cross-bar 10, formed with a longitudinal slot 11 and having secured to its under side a clip 12, similar to that, 9, just referred to. The cross-bar 10 is preferably secured to and made movable with the head-rest, and also carries at its central portion a padded shoulder-rest 13.

Upon each end of the cross-bar 10 is slidingly mounted a collar 14, and arranged over and upon the said collar is a block 15, to which is rigidly attached a spade-handle 16, provided with a cylindrical hand-grip 17. A bolt 18 passes down through the block 15 and collar 14, and also through the slot 11 in the cross-bar 10, and beneath said bar receives a washer 19 and a nut 20, having a handle extension 21, by means of which the nut may be readily turned. By loosening the nut 20 the handle may be adjusted longitudinally of the cross-bar 10, and when brought to the desired point clamped by tightening said nut. Similar bolts and nuts are provided for the head-rest and the parts connected therewith, such bolts (indicated at 22) extending down through the central slot 6 of the board 4 and being provided with handle-nuts 23. By loosening the nuts 23 the head-rest, &c., may be moved longitudinally of the board and clamped at any desired point.

24 designates a stomach or back rest which is padded and secured to a cross-piece 25, the latter having secured to its under side a clip 26, similar to the one, 9, above described. This rest is made adjustable longitudinally of the board by means of a bolt 27 passing down through the slot 6 and provided with a nut 28.

29 represents a foot-stirrup comprising a U-shaped frame 30, lined with leather, as at 31, for supporting the ankle of the patient. The stirrup also has a leather or flexible sole-strap 32, adapted to pass under the instep for enabling the patient to properly brace himself upon the board. Two of these stirrups are provided, the same being secured to the opposite ends of a cross-bar 33, and this cross-bar is, like the other adjustable parts, provided with a clip 34, clamping-bolt 35, and nut 36, whereby it may be adjusted lengthwise of the board 4.

The patient lies upon the rub-down board at full length, either upon his back or stomach, and the attendant, by means of the devices above described, then adjusts the head-rest, stomach or back rest, and foot-stirrups so as to properly support the body and enable the patient to brace himself during the rubbing-down process. The handles 16 may then be adjusted laterally to suit the length of the arms. The patient may thus maintain his body in a rigid condition during the rubbing-down process or massage or other treatment, and thus the work of the attendant or operator is greatly facilitated. The rub-down board at its upper end is provided with eyes 37, which embrace the rod 3 on the bracket and afford a pivotal connection between said board and bracket. When the board is no longer required in use, it may be folded upward against the wall, where it is engaged by a hook 38 and eye 39, attached, respectively, to the wall and free end of the board, or vice versa.

It will be understood that the rub-down board and the several parts thereof are susceptible of changes in the form, proportion, and minor details of construction, which may accordingly be resorted to without departing from the spirit or sacrificing any of the advantages of this invention.

Having thus described the invention, what is claimed as new is—

1. A rub-down board, in combination with a head and shoulder rest adjustably supported thereon, a cross-bar connected to said rest to move therewith, and handholds supported by and adjustable longitudinally on said cross-bar, substantially as described.

2. A rub-down board, a combined head and shoulder rest adjustably supported thereon, a cross-bar connected to said rest to move therewith, and handholds supported by and adjustable longitudinally on said cross-bar, combined with a stomach or back rest adjustably supported on said board, a cross-bar adjustably supported on the said board, spaced foot-stirrups carried by the said cross-bar, and means to lock the parts rigidly in position relative to each other, whereby a patient may support his body and brace it in a rigid position, substantially as described.

3. A rub-down board, in combination with a head and shoulder rest adjustably supported thereon, a cross-bar connected to the head and shoulder rest to move therewith, said bar having a longitudinal slot, handholds slidingly supported on said cross-bar, and clamping-bolts attached to said handholds and extending through the said slot, substantially as described.

In testimony that I claim the foregoing as my own I have hereto affixed my signature in the presence of two witnesses.

MICHAEL JOHN SULLIVAN.

Witnesses:
   THOMAS J. O'CONNOR,
   FRANK HAMILTON.